United States Patent [19]

Maringer et al.

[11] 4,144,746

[45] Mar. 20, 1979

[54] METHOD FOR DETERMINING A MEASUREMENT VALUE PROPORTIONAL TO THE COMPRESSION OF AN INTERNAL COMBUSTION ENGINE

[75] Inventors: Albert Maringer, Karlsruhe; Hans-Henning Otte, Neuburg, Pfalz, both of Fed. Rep. of Germany

[73] Assignee: Siemens Aktiengesellschaft, Munich, Fed. Rep. of Germany

[21] Appl. No.: 882,456

[22] Filed: Mar. 1, 1978

[30] Foreign Application Priority Data

Mar. 2, 1977 [DE] Fed. Rep. of Germany ....... 2709128

[51] Int. Cl.² .......................................... G01M 15/00
[52] U.S. Cl. ................................................. 73/117.2
[58] Field of Search ...................... 73/115, 116, 117.2; 364/424, 431

[56] References Cited

U.S. PATENT DOCUMENTS

| 3,823,606 | 7/1974 | Maringer | 73/115 |
| 4,062,232 | 12/1977 | Sutphin, Jr. | 73/117.2 |

*Primary Examiner*—Jerry W. Myracle
*Attorney, Agent, or Firm*—Kenyon & Kenyon, Reilly, Carr & Chapin

[57] ABSTRACT

A method for determining a measurement value proportional to the compression of an internal combustion engine, derived from the starter current, in which the a-c component of the starter current is integrated over the time between successive current minima and the difference between an integration value averaged over an engine cycle and integration values for individual cylinders obtained between succeeding current minima, is added, with the sign reversed, to the integration value for the next-following cylinder.

8 Claims, 4 Drawing Figures

METHOD FOR DETERMINING A MEASUREMENT VALUE PROPORTIONAL TO THE COMPRESSION OF AN INTERNAL COMBUSTION ENGINE

BACKGROUND OF THE INVENTION

This invention relates to the measurement of internal combustion engine compression in general and more particularly to a new method for determining a measurement value which is derived from the current drain of a starter motor of an internal combustion engine and is proportional to the compression thereof.

A method using starter motor current to determine compression is described in U.S. Pat. No. 3,421,367. In order for an internal combustion engine to deliver the power specified in its design it is necessary that the intended compression be reached in the cylinders. Likewise, the compression in the individual cylinders is a determining factor for the even running of the engine and thereby, for uniform stress of the crankshaft and the bearings. In the course of the life of an engine, the compression in the individual cylinders can deteriorate differently, so that there is a need, when the engine is serviced, to also check compression, but particularly to check the variation in compression between cylinders. The methods customarily used for this purpose until recently were cumbersome; a pressure gage had to be screwed into each cylinder in place of the spark plug. However, the U.S. Patent mentioned above described a method in which the current drain of a starter motor serves as a measure for the pressure waveform in the individual cylinders. The ignition remains turned off during testing, so that the internal combustion engine is turned over only by the starter motor. In that Patent, a shortcoming of the new method which results from the fact that the influences of the individual cylinders of the internal combustion engine are super-imposed on each other in the measure starter current is also mentioned. If a cylinder lacks compression, a current increase occurs in the cylinder which comes next in the engine cycle, because part of the energy contained in the compressed air of the preceding cylinder is missing. This missing energy must be supplied by the current source of the starter motor, which manifests itself in the current increase mentioned. No solution to this problem is given in the aforementioned U.S. Patent.

SUMMARY OF THE INVENTION

It is an object of the present invention to find a method which, while based on a simple starter current measurement, allows compensation of errors in this method. It starts out from the discovery that this error can be compensated more easily by looking at the processes from an energy point of view, since the error is caused by a loss of stored work.

Consideration has already been given in U.S. Pat. No. 3,389,599 to integrated electrical values, corresponding to the cylinder pressure, from a measuring transducer over the time or, equivalently, over the crankshaft angle, instead of using the mean effective pressure, in cylinders of internal combustion engines. This idea, however, was rejected again because the integration value obtained has only a loose relationship with the wanted mean effective pressure which represents an integration of the cylinder pressure over the piston travel.

According to the present invention, the stated problem is solved in a method of the type described above by providing that the a-c component of the starter current or a voltage proportional to this current is measured and is integrated during at least one complete cycle of the engine between respective succeeding current minima with respect to time, and any difference resulting from a comparison of an integration value averaged over a complete engine cycle and the individual integration values (for individual cylinders) is added, with the sign reversed, to the next-following individual integration value and the thus improved integration values serve as mutually comparable measures for the compression of the individual cylinders.

The new method allows compensating for the above-mentioned distortions which occur if the measurement of the current integrals representing the compression energy of the individual cylinders is not corrected.

Considering the compression energy provides a better basis than the measurement of the maximum pressures, particularly for investigating the evenness of the running of the engine, since the eveness is determined less by the maximum pressure within the combustion chambers than by the work required to move the piston from lower dead center to upper dead center. In addition to the compression energy, this work also consists of the friction energy. In addition, the heat loss during the compression process also enters into the energy balance, since the compression does not take place adiabatically. Energy considerations do better justice to these interrelations than consideration of the maximum pressures reached in the cylinders.

Under the usually correct assumption that the battery voltage remains constant while the engine is being turned over, the integral of the a-c component of the starter current over the time provides a measure of the work expended during the compression.

An additional improvement of the individual integration values is obtained if the difference between an improved integration value and the averaged integration value is added to a value following the improved value.

It is advantageous to subject the a-c component of the starter current to an instantaneous analog to digital conversion and to add up the digital values between two successive current minima for the purpose of integration. In an equally successful alternate method, however, the entire starter current can be sampled and converted into digital amplitude values if the digital values summed up between two minima are subsequently decreased by the integral of the d-c values between the same minima.

In order to obtain a reference voltage as accurate as possible for the amplitude values of the a-c component, the mean is always formed from eight measured extreme values of the starter current and can be compared with a stored mean value for the purpose of determining whether to replace the stored value.

The current values are measured within predetermined speed limits of the starter.

A circuit for implementing the method according to the present invention includes a first signal transmitter providing an output at a selected position of the crankshaft; a second signal transmitter providing an output in response to a selected event occurring during an engine cycle at a predetermined cylinder of the engine; a measuring amplifier for the starter current or a voltage proportional to this current; an analog to digital converter connected to the output of the amplifier; and a processing unit connected to the output of the converter, which contains an integrating counter, adders, comparators, memories and a numerical display, and which is in control relationship with the signal transmitters.

DETAILED DESCRIPTION OF THE INVENTION

Figure 1:
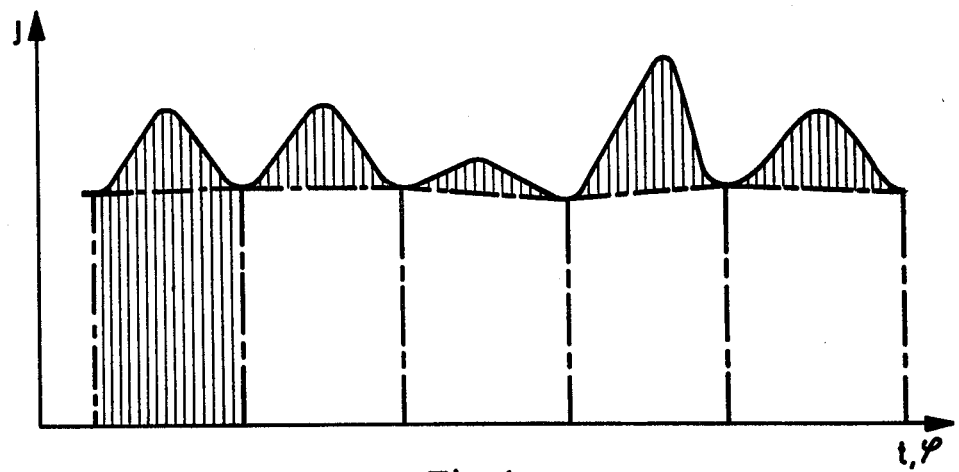
FIG. 1 is a diagram of the starter current while the internal-combustion engine is being turned over.

In the diagram of FIG. 1, time or, equivalent thereto, the crank angle is plotted along the abscissa. The instantaneous value of the starter current is plotted in the direction of the ordinate. The starter current is composed of a d-c component and a superimposed a-c component. The distance between current minima is always 180° of crank angle. The diagram shown in the figure is the diagram of a four cylinder four stroke engine. The current maximum that has occurred last (at right in the diagram) corresponds again to the first maximum. The lower dead center of the piston of the respective cylinder corresponds to the minimum of the starter current. The compression energy for one cylinder is then obtained by integrating the current values from the minimum to the next maximum. The integration from this maximum to the following minimum yields an area which is a measure for the delivery of the energy stored in the compressed gas mixture. The integration between two succeeding minima, reduced by the trapezoidal area which is formed by the two minima and the zero line, results in an area which at least approximately allows a statement to be made regarding the energy supply during the compression and the expansion of the gas during the work stroke of the piston.

Figure 2:
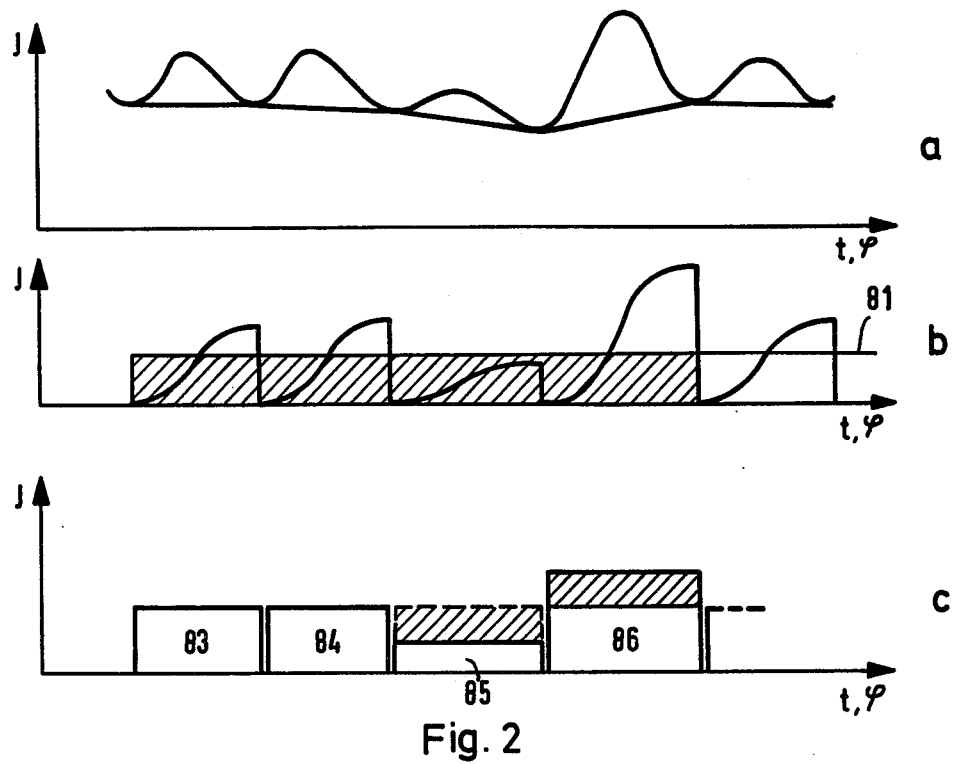
FIGS. 2a to 2c are respectively a further current diagram, a normalized current-time area diagram and a still further schematized diagram of the current-time areas.

FIG. 2a shows essentially the same current diagram as FIG. 1. In addition, a sequence of lines connecting the minima of the a-c component is drawn here. As in FIG. 1, it can be seen in FIG. 2a that not all the cylinders of the engine under consideration have equally good compression. It is evident that the third cylinder in the firing sequence has a lower compression value than the preceding or the following cylinders. A cylinder with good compression contains a large amount of stored energy in the compressed gas at the time of the pressure maximum. Upon the expansion of the gas during the work stroke following the compression stroke, the energy is reconverted into kinetic energy, which is given to the crankshaft and aids the starter motor during the compression of the next following cylinder. In the case of a cylinder with poor compression, the energy absorbed by the compressed gas and thereby, the integral area under the current curve are both smaller. During the expansion of the gas content of the poor cylinder, less energy is converted into kinetic energy, and therefore, the battery, from which the starter current is taken, must supply additional energy during the compression of the next-following cylinder. The current maximum which is associated with this cylinder shows an increase. This increase of the current thus does not result from a compression pressure greater than the other cylinders of the engine. This increase therefore represents a distortion of the diagram which could lead to incorrect conclusions if one takes the maxima as a measure of compression.

The correction of the above-mentioned distortions in accordance with the present invention will be explained with the aid of FIGS. 2b and 2c. In FIG. 2b the crank angle or the time is again plotted on the abscissa, and on the ordinate, normalized values of the starter current are plotted. Furthermore a shaded rectangle, which corresponds to an averaged integral value is entered in the diagram. The difference between the averaged integral value over the two minima which enclose the section of the curve with the lowest amplitude, and the area under this curve section yields approximately that work which is additionally required by the next-following cylinder during the compression. This different is therefore subtracted from the compression energy of the following cylinder. This operation is shown symbolically in the diagram of FIG. 2c with normalized area values. As a further correction of the distortion, the difference between the averaged integral value and the result of the preceding correction is formed and the work area of the following cylinder is supplemented either additively or subtractively by this difference.

Figure 3:
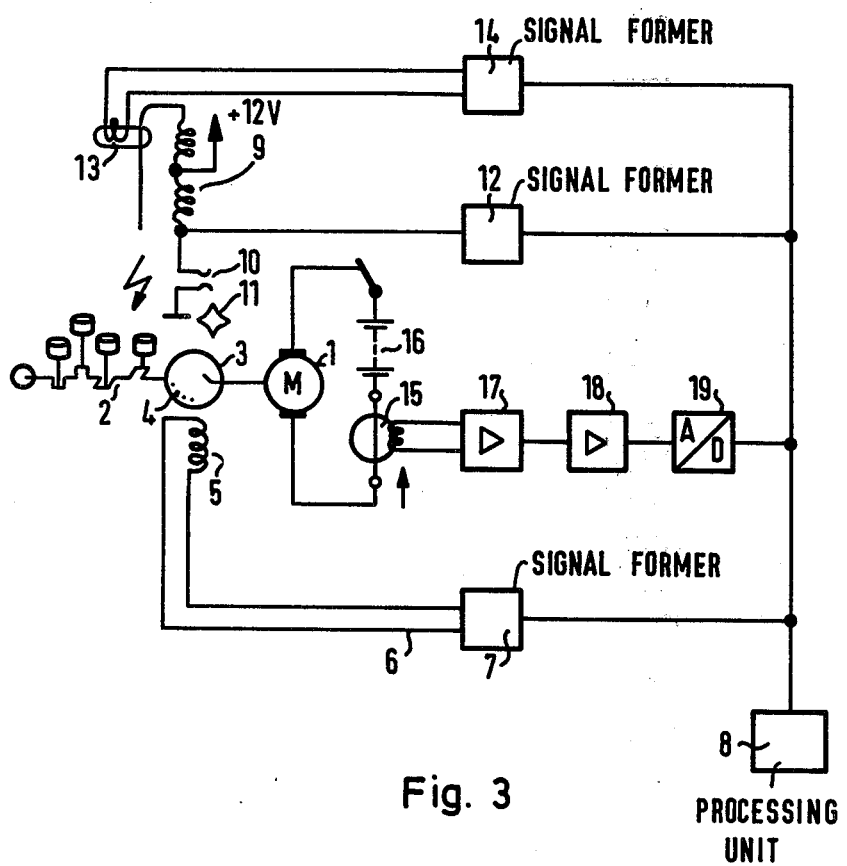
FIG. 3 is a schematic circuit diagram of a measuring arrangement for implementing the method according to the present invention.

FIG. 3 shows a circuit with which the method according to the invention can be implemented. A starter motor 1 is coupled to the crankshaft 2 of a four-cylinder engine. At the coupling flange 3 of the crankshaft, marks 4 which correspond to the upper or lower dead centers of the pistons of the engine are arranged. The marks 4 are picked up by a dead center transmitter 5. Signals from the transmitter 5 are fed to a processing unit 8 via a line 6 and a signal former 7. The signals from the signal transmitter 5 can also be replaced by signals which can be taken off at the base of an ignition coil 9 of the ignition system of the four cylinder engine. They are generated when an interrupter contact 10 is opened or closed by a cam 11 which is driven by the crankshaft 2. The signals from the base of the ignition coil 9 can also be fed to the processing unit 8 via a signal former 12. A third signal transmitter 13 derives a signal from an event associated with a predetermined cylinder of the engine, for instance, the appearance of the ignition voltage at the spark plug of the first cylinder. To this end, the signal transmitter 13 is designed as an inductive probe at the ignition line. The signals of the signal transmitter 13 are likewise fed to the processing unit 8 via a signal former 14. By means of a current transformer 15, the current for the starter 1, taken from a battery 16, is fed, via two amplifier stages 17 and 18, to an analog to digital converter 19. The digital output of the analog to digital converter is likewise connected to an input of the processing unit 8. The current transformer 15 can also be replaced by a measuring resistor which is connected into the current lead of the starter motor 1, and the voltage drop of which is then proportional to the starter current. The amplifier stages 17 and 18 also contain filter units, which filter out interference signals such as are generated by the commutation of the starter current.

Figure 4:
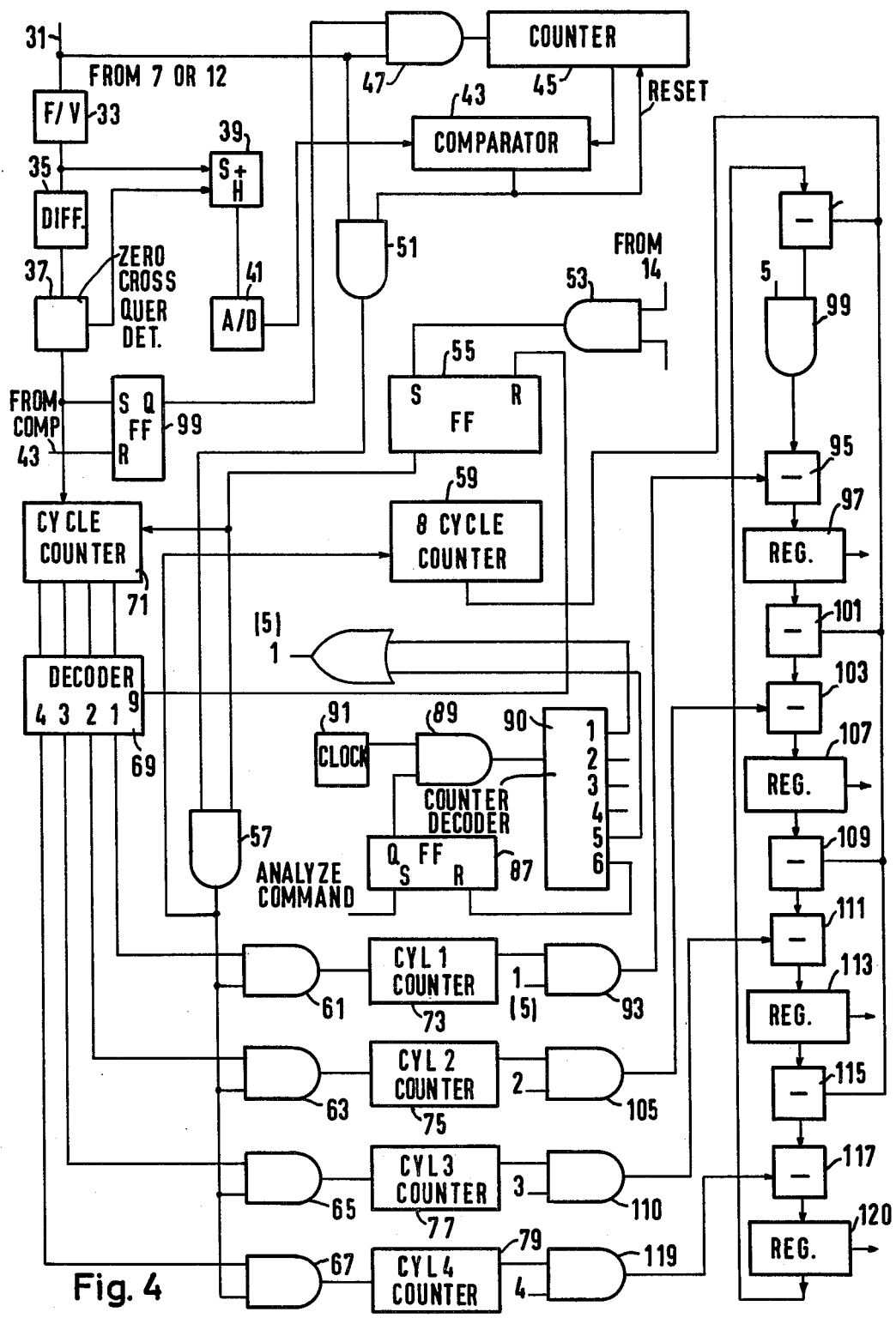
FIG. 4 is a block diagram of a processing unit which may be used in the present invention.

The signal processing unit 8 may be implemented in a number of different ways. An implementation using discrete digital circuits is illustrated on FIG. 4. In this implementation, The analog to digital converter of FIG. 3 will be an analog voltage to frequency converter. In other words, it will put out a pulse rate have a frequency proportional to the input analog signal. This signal enters the processor 8 on line 31 of FIG. 4. The signal is converted back into a voltage in a frequency to voltage converter 33, is differentiated in a differentiator 35 and a zero cross-over detected in a zero cross-over detector 37. This permits determining the minimum points on the curves shown on FIGS. 1 and 2.

An output from the zero cross-over detector is a sampling input to a sample and hold circuit 39 which receives its data from converter 33. Thus, the sample and hold circuit 39 stores the minimum value each time it is detected. This minimum represents the DC component. This value is reconverted into digital form in an analog to digital converter 41. The output of analog to digital converter 41 is an input to a comparator 43. Comparator 43 has as its second input, the output of a counter 45. The input to counter 45 is through an AND gate 47 coupled to line 31 and having an enabling input from a flip-flop 49.

Once operation starts, and a zero cross-over is detected, an output from zero cross-over detector 37 sets the flip-flop 49 to enable the gate 47. This is the beginning of a cycle. The counter 45 counts until it reaches the value at the other input of the comparator, at which time there is an output pulse from the comparator 43 which resets flip-flop 49, resets counter 45 and enables a gate 51 also having, as a second input, the pulses on line 31.

Operation is started by providing a signal on a gate 53. When a signal is received from the signal former 14 the output of this gate sets a flip-flop 55 which enables a gate 57 having as its other input the output of gate 51. The output of gate 57 is coupled into an 8 cycle counter 59 and into gates 61, 63, 65 and 67.

These gates are respectively enabled by outputs of a decoder 69 which receives inputs from a cycle counter 71. The cycle counter is advanced by the output from the zero cross-over detector 37 each time a minimum value is detected. Thus, for the first minimum the one output of decoder 69 will be present enabling gate 61. Once the number of counts corresponding to the DC value have been passed, gate 51 and 57 are now both enabled as is gate 61 and a counter 73, which has the output of gate 61 as an input, begins counting. In similar fashion, gates 63, 65 and 67 are successively enabled so as to permit counts to be stored in counter 75, 77 and 79. In order to get good average values, the cycles are run through twice. In other words, the counter 59 stores a total of eight cycles. Each of the cylinder counters stores a count for two cycles thus permitting averaging over two cycles. When the ninth zero cross-over is detected and the output of decoder 69 goes to 9, flip-flop 55 is reset disabling further counting. There is now stored in counter 59 a value corresponding to the average shown by line 81 in FIG. 2. There are also stored in counters 73, 75, 77 and 79 values corresponding to the quantities 83, 84, 85 and 86 of FIG. 2c.

It is now necessary to carry out the subtractions indicated by FIG. 2c in accordance with the method of the present invention. This is initiated by supplying an analyze command to a flip-flop 87 to enable an AND gate 89 having its other input from a clock 91 and supplying an output to a counter-decoder 90. On the first count, an AND gate 93 is enabled to gate-out the contents of counter 73 to a subtracter 95 receiving an input from another subtracter 97 through an AND gate 99. At this point, gate 99 is not enabled and thus the second input to the subtracter 95 will be zero. Thus, the value coupled through the gate 93 will appear at the output of the subtracter 95 and will be stored in a register 97.

The value in the register 97 is an input to a further subtracter 101 which has as its second input the average value out of the counter 59. This value is obtained from the counter by dividing by 4 for the four cylinders, which is simply accomplished by not using the two least significant bits. Here, the average value is now subtracted from the value stored in the counter 73. Using the example of FIG. 2 and arbitrarily assigning values of 10 to the quantities 83 and 84, 5 to the quantity 85 and 15 to the quantity 86, there will be an average of 10, which when subtracted from the actual value of 10 would result in an output of zero from the subtracter 101.

The output of subtracter 101 is an input to another subtracter 103 receiving its input from a gate 105. This gate gates the output of the second counter 75. The counter-decoder 90 will have advanced one at this point and now the value stored in the counter will have subtracted from it the value from the subtractor 101. In the present example this is zero so the full value of counter 75 will be stored in a register 107. Once again, in subtracter 109 the average is subtracted from this value and again, in the example given, the result will be zero. Thereafter, gate 110 is enabled and the value from the counter 77 is provided to a subtracter 111 where the output of the subtracter 109 is subtracted. In this case, in the example the value out of the counter is 5. When zero is subtracted therefrom, a value of 5 will be stored in the register 113. Now, when the average value is subtracted therefrom in a subtracter 115, the result is a minus 5. This is the input to a subtracter 117 which receives its second input from the gate 119 which gates the output of the counter 79. In the example this value is assumed to be 15, so that, when 5 is subtracted therefrom the result which is stored in a register 121 is 10. In the illustrated embodiment, this value is fed back to the subtracter 97. Now, on the fifth count, gate 99 is enabled and the output of subtracter 97 is thus subtracted from the output of counter 73 in subtracter 95. In this example, since the average is 10 and since the corrected value is register 121 is 10, the output which eventually reaches register 97 will remain at 10. The final results in the example would be an output of 10 from register 97, 10 from register 107, 5 from register 113 and 10 from register 117. In this manner, the additional energy which was required in compressing the fourth cylinder, because of the low energy in the third cylinder, is compensated and one realizes that three of the cylinders have approximately the same compression whereas the fourth cylinder, i.e., cylinder number 3, has a problem. The data stored in the registers is provided as outputs to appropriate displays so that the data can be analyzed.

It will be recognized that, although single lines are shown as running between the various components and single gates are shown, in actuality a plurality of such will be required since the digital values handled will be a number of bits. Furthermore, the necessary reset lines are not shown on the drawing for the sake of simplicity. Means are provided at the end of a cycle for resetting all counters and registers in conventional fashion.

It can be seen that this implementation is rather complex. With the availability of microprocessors the method of the present invention can also be implemented by programming a conventional microprocessor to carry out the functions performed by the discrete hardware elements of FIG. 4. In such a case, the analog to digital converter 19 would convert to a digital word which would be sampled by the microprocessor a number of times over a cycle obtaining a plurality of samples which could then be added or averaged. The signals from the signal formers 7, 12 and 14 would be additional inputs to the microprocessor to maintain control of a time monitored program loop.

In whatever manner implemented, the integration from minimum to minimum takes place during a given number of crank shaft revolutions. This permits forming an average value which compensates for irregular valve opening and closing times during starting. After a sufficient number of compression values have been measured, the ignition of the engine is then released.

If implementing in a microprocessor, for example, it is advisable to measure eight successive minimum values and to average them in order to determine a minimum or DC value which is to be subtracted. This value can then be stored in an appropriate storage register. In such cases, if the value determined last is higher than the stored contents, then the old values can be overwritten with the new values. If the actual value is smaller than the content of the storage cell for the minimum value, then the actual value is written into this location. If no new minimums are determined during 16 measurements, the old value is retained. In that case one is assured that a minimum of the current for a 180° revolution of the crank shaft has been found.

Operation of the present invention, particularly measurement, should take place within predetermined speed limits. Conventional means can be provided to check on the speed. For example, when using the implementation of FIG. 4 one can adjust the speed using a tachometer. Where a microprocessor type implementation is utilized, speed checks can be carried out by checking the number of current values, the current values being sampled at a constant clock ratewhich are sampled between two minimums. Furthermore, in the case of a serious problem, where the compression for one cylinder is completely missing, time between the detection of two minimums will become double. In a microprocessor implementation, an appropriate program can detect this by sensing the approximate doubling of the number of current values added up between two minima. These and other modifications may be made without departing from the spirit of the invention which is intended to be limited solely by the appended claims.

What is claimed is:

1. A method for determining a measurement value which is derived from the current drain of the starter motor cranking an internal combustion engine and is proportional to the compression thereof, comprising:
   a) measuring a value proportional to at least the a-c component of the current during cranking;
   b) integrating said value during each complete engine cycle between respective succeeding current minima with respect to time to obtain individual cylinder values;
   c) integrating said value over a full engine cycle and averaging the integral to obtain an average value;
   d) finding the difference between said average value and each individual cylinder value; and
   e) adding each difference with its sign reversed, to the next following individual cylinder value to obtain improved values whereby the values thus obtained will serve as comparison measures for the compression in the individual cylinders.

2. The method according to claim 1, and further including using the improved values when finding said difference.

3. The method according to claim 1, and further comprising converting the a-c component of the starter current in an instantaneous analog-to-digital conversion and adding the digital values between two succeeding minima to carry out said integration.

4. The method according to claim 1, and further comprising subjecting the starter current to an instantaneous analog-to-digital conversion, adding the digital values between two minima to obtain a sum, and subtracting the integral of the d-c values between the two minima from the sum.

5. The method according to claim 1, and further including forming a mean value of eight measured extreme values of the starter current and comparing said means with a stored mean value for the purpose of a possible replacement of the stored value.

6. The method according to claim 1, wherein said measurement of the current values takes place with predetermined speed limits of the starter motor.

7. Apparatus for determining a measurement value which is derived from the current drain of the starter motor cranking an internal combustion engine and is proportional to the compression thereof, comprising
   a) a means for measuring a value proportional to at least the a-c component of the current during cranking;
   b) a means for integrating said value during each complete engine cycle between respective succeeding current minima with respect to time to obtain individual cylinder values;
   c) a means for integrating said value over a full engine cycle and averaging the integral to obtain an average value between said value;
   d) a means for finding the difference between said average value and each individual cylinder value; and
   e) a means for adding each difference with its sign reversed, to the next following individual cylinder value to obtain improved values whereby the values thus obtained will serve as comparison measures for the compression in the individual cylinders.

8. Apparatus according to claim 7 comprising a first signal transmitter responsive to a selected position of the crankshaft; a second signal transmitter responsive to a selected event occurring during an engine cycle at a predetermined cylinder of the engine; a measuring amplifier for a quantity proportional to the starter current; an analog-to-digital converter coupled to amplifier; and a processing unit coupled to the output of the converter.

* * * * *